(12) United States Patent
Yoshida et al.

(10) Patent No.: US 6,227,839 B1
(45) Date of Patent: May 8, 2001

(54) DRIVING DEVICE FOR INJECTION MOLDING MACHINE

(75) Inventors: Isamu Yoshida; Masahiro Nobutomo; Koji Tateishi; Takayuki Owada, all of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/291,113

(22) Filed: Apr. 14, 1999

(30) Foreign Application Priority Data

Apr. 17, 1998 (JP) .................................................. 10-108092

(51) Int. Cl.[7] ........................................................ B29C 45/66
(52) U.S. Cl. ............................ 425/145; 425/150; 425/589
(58) Field of Search ................................... 425/145, 150, 425/149, 589

(56) References Cited

U.S. PATENT DOCUMENTS

| | | | | |
|---|---|---|---|---|
| 5,206,034 | * | 4/1993 | Yamazaki | 425/145 |
| 5,378,141 | * | 1/1995 | Aoki | 425/589 |
| 5,863,567 | * | 1/1999 | Klaus | 425/145 |
| 6,059,556 | * | 5/2000 | Koike et al. | 425/145 |

* cited by examiner

*Primary Examiner*—Tim Heitbrink
(74) *Attorney, Agent, or Firm*—Wenderoth, Lind & Ponack, L.L.P.

(57) ABSTRACT

An injection unit driving device or an mold-clamping unit driving device having a ball screw having a long life. Of the parts of the ball screw, only the balls are subjected to carburizing/nitriding treatment, while the threaded shaft and the nut are subjected to conventional hardening.

8 Claims, 3 Drawing Sheets

DRIVING DEVICE FOR INJECTION MOLDING MACHINE

BACKGROUND OF THE INVENTION

This invention relates to a driving device for an injection molding machine, and particularly to driving devices for an injection unit and a mold-clamping unit.

A ball screw shaft is used to drive various members along the axis of a molten resin extrusion screw of an injection molding machine. The ball screw comprises a threaded shaft formed with a thread groove on its outer periphery, a nut having a thread groove on its inner periphery and being screwed onto the threaded shaft, and balls received in the thread grooves of the shaft and the nut.

The threaded shafts of conventional ball screws are formed by induction-hardening steel (e.g. AISI4150) or by carburizing chrome-molybdenum steel (e.g. SCM415) to the hardness of about 58–62 in HRC. The nuts are formed by carburizing e.g. SCM415 to the hardness of about 58–62 in HRC. The balls are formed by hardening bearing steel (e.g. SUJ2) to the hardness of 60 in HRC or over.

Among the parts of a ball screw, the balls' life tend to expire first. This is because when the nut is moved by rotating the threaded shaft, the contact surface between the threaded shaft and the nut becomes oval, and the distances between the center of the threaded shaft and various points of the oval contact surface differ from one another, so that the balls purely roll only at two points of the oval contact surface and slip at the other area. As a result, the balls are damaged due to this differential slipping.

In the case of a ball screw, compared with rolling bearings, its shape makes it difficult to finish to groove shape accuracy and surface roughness comparable to inner and outer bearing rings. Thus, if bearing balls are used for the balls of a ball screw, the balls are liable to be damaged severely. Thus, the balls' life expires first.

Among ball screw type driving devices for injection molding machines, a ball screw used in a driving device used for an injection unit to axially advance and retract an extrusion screw for extruding molten resin, and a ball screw used in a driving device used for a mold-clamping unit for advancing and retracting a movable platen tend to be short in stroke from when a load begins to act until the ball screw stops, so that the balls tend to stop abruptly. Thus, a load nearly as heavy as an impact load acts on the balls.

When the balls' life expires, the life of the entire ball screw also expires. Thus, conventional ball screws used in driving devices for injection unit and mold-clamping units of injection molding machines were relatively short-lived.

An object of this invention is to extend the life of a ball screw used in a driving device for an injection unit or a mold-clamping unit of an injection molding machine by extending the life of its balls, and thus to improve the performance of the driving device.

SUMMARY OF THE INVENTION

According to this invention, there is provided a driving device for an injection molding machine having an injection unit, a mold clamping unit and an extrusion screw for extruding molten resin, the driving device comprising a ball screw including a threaded shaft, a nut and balls disposed between the threaded shaft and the nut, the nut being coupled to the extrusion screw, and a driving source coupled to the threaded shaft for driving the injection unit. The threaded shaft and the nut are hardened, and the balls are carburized and nitrided.

According to the present invention, there is also provided a driving device for an injection molding machine having an injection unit, a mold clamping unit having a movable platen, and an extrusion screw for extruding molten resin. The driving device comprises a ball screw including a threaded shaft, a nut and balls disposed between the threaded shaft. The of the threaded shaft and the nut is coupled to the movable platen of the mold clamping unit, and a driving source is coupled to the other of the threaded shaft and the nut for driving the mold clamping unit. The threaded shaft and the nut are hardened, and the balls are carburized and nitrided.

The balls of the ball screw should have a surface hardness of not less than 62 in HRC. Also, the threaded shaft may be induction hardened or carburizing hardened whereas the nut should be carburizing hardened.

Other features and objects of the present invention will become apparent from the following description made with reference to the accompanying drawings, in which:

DETAILED DESCRIPTION OF THE PREFERRED EMBODIMENT

Figure 1:
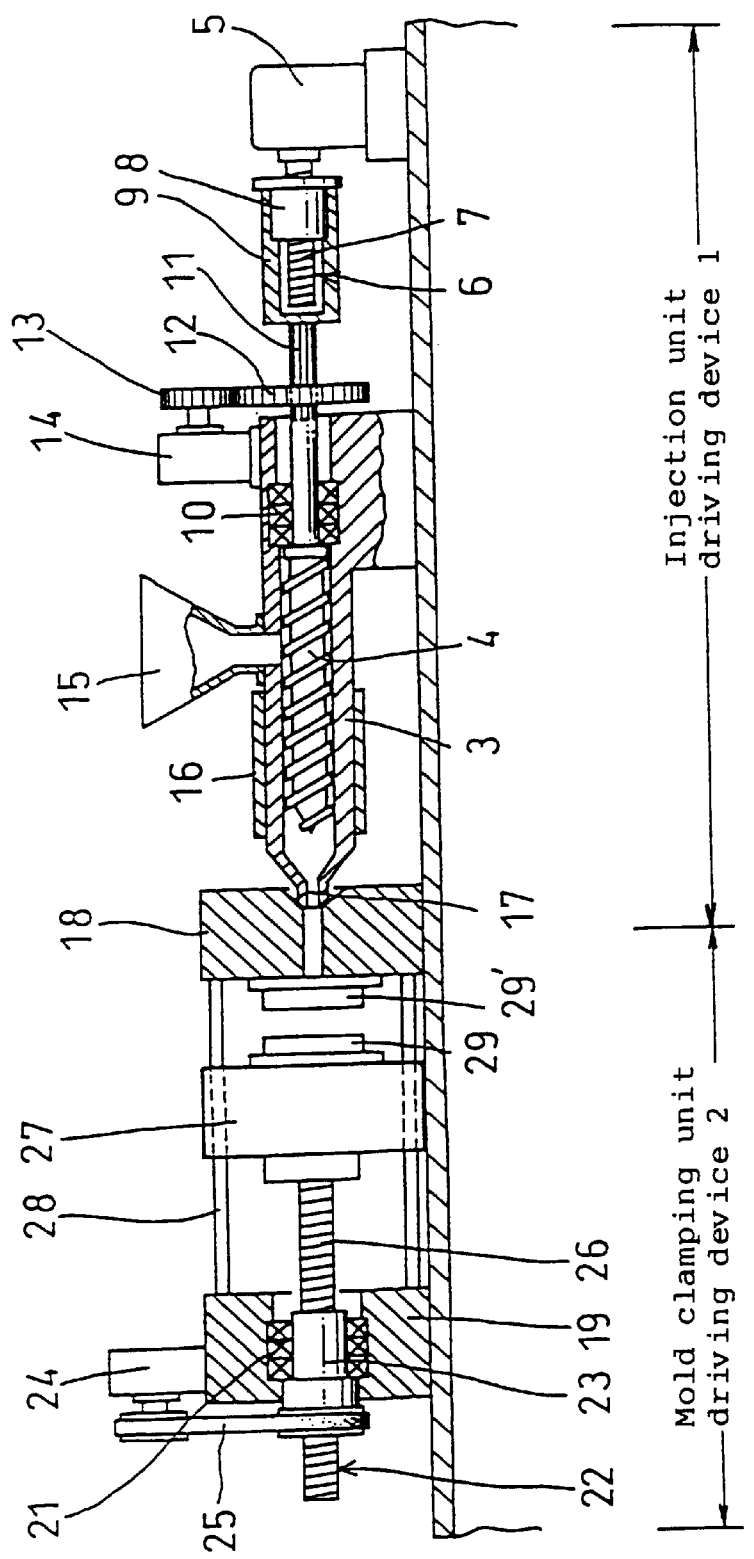
FIG. 1 is a sectional view of a first embodiment.

Embodiments of this invention are now described with reference to the attached drawings. The first embodiment shown in FIG. 1 relates to a driving device 1 for an injection unit and a driving device 2 for a direct-pressure type mold-clamping unit.

The injection unit driving device 1 axially advances and retracts an extrusion screw 4 inserted in a heating cylinder 3. It has a rotary driving source 5 comprising a speed reducer and a motor, and a drive shaft to which is coupled a threaded shaft 7 of a ball screw 6. A nut 8, fitted on the threaded shaft 7, is integral with the inner periphery of a cylindrical coupling member 9. The coupling member 9 has one end thereof coupled to the rear end of the extrusion screw 4, which is aligned with the threaded shaft 7.

The extrusion screw 4 is rotatably and axially movably supported by bearings 10 in the heating cylinder 3. At its exposed rear end, the screw 4 is formed with serrations 11 that mesh with a gear 12 coupled to a rotary driving source 14 for the screw 4 through a gear 13. A material supply hopper 15 is provided at the top of the heating cylinder 3. A heater 16 is fitted around the heating cylinder 3.

By rotating the screw 4, a resin material in the hopper 15 is fed forward and heated and melted by the heater 16 while being fed. By actuating the driving source 5 for the injection unit driving device 1, the threaded shaft 7 of the ball screw 6 is rotated, so that the nut 8 and the coupling member 9 integral with the nut 8 advance, thus advancing the extrusion screw 4 coupled to the coupling member 9. The molten resin in the heating cylinder 3 is thus injected into a fixed platen 18 through a nozzle 17 at the tip of the cylinder 3. Upon completion of injection of resin, the extrusion screw 4 is rotated in the direction for feeding resin material by the driving source 14 to feed resin material, and at the same time, the screw 4 is retracted by rotating the coupling member 9 and the nut 8 to prepare for the next extrusion.

On the other hand, the mold-clamping unit driving device 2 comprises a fixed base 19, a ball screw 22 and a nut 23 rotatably supported on the base 19 through bearings 21, and a rotary driving source 24 comprising a motor and a speed reducer. The force of the driving source is transmitted to the nut 23 through a belt 25. The nut 23 is threaded on a threaded shaft 26 having one end thereof coupled to a movable platen 27 which is slidably supported by a guide bar 28 provided between the fixed platen 18 and the fixed base 19 so as to be movable toward and away from the fixed platen 18. On their opposed faces, the fixed platen 18 and the movable platen 27 carry molds 29 and 29', respectively. While not shown, the movable platen 27 has a retractable push-out pin for pushing out a molded article.

By rotating the rotary driving source 24 of the mold-clamping unit driving device 2, the nut 23 rotates, thus moving the movable platen 27 toward the fixed platen 18 together with the threaded shaft 26. The molds 29 and 29' are thus clamped together. By reversing the driving source 24, the movable platen 27 retracts, separating the molds 29, 29' from each other. With the molds separated, the molded article is pushed out.

Since the ball screws 6 and 22 of the injection unit driving device 1 and the mold-clamping unit driving device 2 are structurally identical to each other, only the ball screw 6 is described in detail below.

Figure 2:
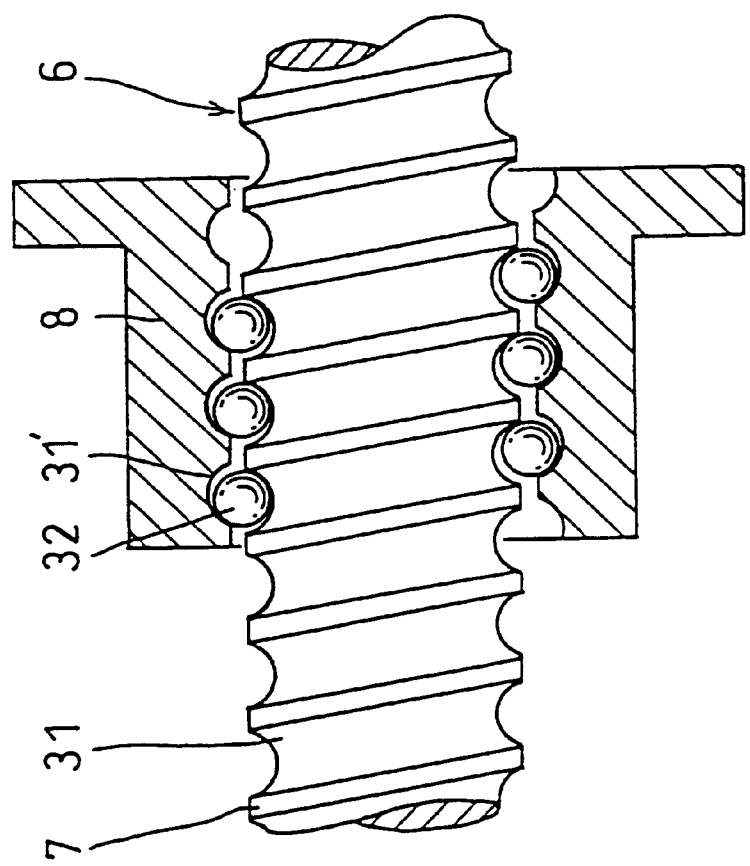
FIG. 2 is a partial enlarged sectional view of the first embodiment.

Referring to FIG. 2, the threaded shaft 7 of the ball screw 6 is formed with a thread groove 31 in its outer periphery, while the nut 8 is formed with a thread groove 31' in its inner periphery.

The threaded groove 31' of the nut 8 has its both ends connected together by a ball return channel, not shown. Numerous balls 32 are received in the thread groove 31' and the ball return channel.

The thread shaft 7 is formed by induction-hardening steel for induction hardening or by carburizing case-hardened steel so that it has a hardness of about 58–62 in HRC. The threaded shaft 7 may be formed by grinding or rolling. The nut 8 is formed by carburizing chrome-molybdenum steel to a hardness of about 58–62 in HRC. The balls 32 are formed by subjecting bearing steel to carburizing/nitriding treatment.

By subjecting the balls 32 to carburizing/nitriding treatment, maltensite deposits in a greater amount in the superficial layer than when subjected to normal hardening, and the surface hardness increases to over 62 in HRC. Thus, it is possible to make the balls 32 less sensitive to cracking and prolong the life of the balls 32 which roll while sliding.

[Life Test]

Five kinds of specimens (Nos. 1–5) listed in appended Table 2 were prepared and subjected to a life test in which a life tester was operated continuously until each specimen developed flaking. The test conditions are shown in Table 3 and the test results are shown in Table 4. The number of locations where flaking was observed in each specimen is shown in Table 5.

As will be apparent from Table 4, for ball screws of which only the balls 32 were subjected to carburizing/nitriding treatment and which have groove curvatures of 110% and 107%, their lives were 2.5 times and 2.0 times, respectively, as long as that of a standard article of which the balls 32 were subjected to normal hardening.

But for specimen No. 5, of which the threaded shaft 7, nut 8 and balls 32 were all subjected to carburizing/nitriding, its life was only 82% of the life of a standard article having the same groove curvature (specimen No. 3), and 41% of the life of an article having the same groove curvature and having only the balls 32 subjected to carburizing/nitriding (specimen No. 4).

One possible reason why specimens having their threaded shaft 7, nut 8 and balls 32 all subjected to carburizing/nitriding were short in life is presumably because the threaded shaft 7 and the nut 8 strengthened by carburizing and nitriding tend to attack the balls 32 severely.

As is apparent from Table 5, in order to extend the life of a ball screw, it is essential to extend the life of the balls 32 themselves.

Figure 3:
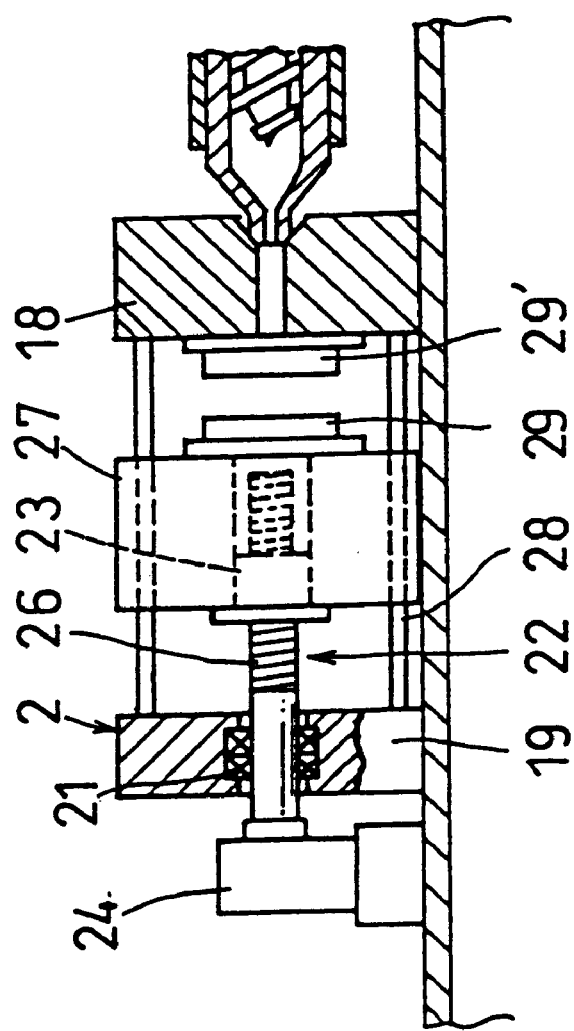
FIG. 3 is a partial sectional view of a second embodiment.

FIG. 3 shows the second embodiment in which a mold-clamping unit driving device 2 includes a ball screw 22 having its nut 23 secured to the movable platen 27. A threaded shaft 26 is screwed into the nut 23 and is rotatably supported on the fixed base 19 by bearings 21. A rotary driving source 24 is coupled to the threaded shaft 26. Thus, when the threaded shaft 26 is rotated by the driving source 24, the movable platen 27 moves forward or backward together with the nut 23, thus clamping or opening the molds 29, 29'. The second embodiment is the same as the first embodiment in other points.

The mold-clamping driving device 2 of either embodiment is a direct-pressure type. But a toggle joint type device may be used instead.

As described above, according to this invention, since the balls of the ball screw are subjected to carburizing/nitriding treatment, while the threaded shaft and the nut are subjected to ordinary heat treatment, it is possible to prolong the life of the balls and thus the entire ball screw without increasing the size of the balls and thus the entire ball screw.

TABLE 1

| Basic Specification | |
|---|---|
| Shaft diameter | 28 mm |
| Lead | 5 mm |
| Lead angle | 3° 10' |
| Circulation number | 2.5 rolls |
|  | 1 row |
| Ball diameter | 1/8 (3.175 mm) |
| Load ball; spacer ball | 1:1 |

TABLE 2

Specifications of Specimens

| Specimen No. | Groove curvature | Shaft Material | Shaft Heat Treatment | Nut Material | Nut Heat Treatment | Ball Material | Ball Heat Treatment | Number |
|---|---|---|---|---|---|---|---|---|
| No. 1 | 110% | S45C | Induction hardening | SCM415 | Carburizing hardening | SUJ2 | Hardening | 5 |
| No. 2 | | | | | | SUJ2 | Carburizing/ Nitriding | 6 |
| No. 3 | 107% | | | | | SUJ2 | Hardening | 10 |
| No. 4 | | | | | | SUJ2 | Carburizing/ Nitriding | 10 |
| No. 5 | | SCM415 | Carburizing/ Nitriding | SCM415 | Carburizing/ Nitriding | SUJ2 | Carburizing/ Nitriding | 5 |

Note 1. The groove curvature is the ratio of radius of thread groove to the radius of ball.
Note 2. Measuring results after heat treatment of ball
Surface hardness: 62–64 HRC
Carburized/nitrided layer: 0.15 to 0.2 mm

TABLE 3

Test conditions

| | |
|---|---|
| Number of revolution | 300 rpm |
| Lubrication | Lubricating oil for sliding surface VG 68 80 cc/min |
| Operation cycle | operated for 6 seconds stopped for 2 seconds |
| Pre-load | constant at 450 kgf |

TABLE 4

| Specimen | $L_{10}$ life (rev) | Calculated* life ratio |
|---|---|---|
| No.1 | $1.51 \times 10^6$ | 1.12 |
| No.2 | $3.64 \times 10^6$ | 2.70 |
| No.3 | $5.65 \times 10^6$ | 3.74 |
| No.4 | $10.1 \times 10^6$ | 7.48 |
| No.5 | $4.16 \times 10^6$ | 3.08 |

*Calculated life: $1.35 \times 10^6$ rev

TABLE 5

| Flaked points | No.1 | No.2 | No.3 | No.4 | No.5 |
|---|---|---|---|---|---|
| ball | 5/5 | 9/10 | 10/10 | 9/10 | 4/5 |
| Threaded shaft | 0/5 | 0/10 | 0/10 | 1/10 | 0/5 |
| Nut | 2/5 | 3/10 | 1/10 | 3/10 | 2/5 |

What is claimed is:

1. A driving device for an injection molding machine having an injection unit, a mold clamping unit, and an extrusion screw for extruding molten resin, said driving device comprising:

a ball screw including a threaded shaft, a nut, and a plurality of balls disposed between said threaded shaft and said nut, wherein said nut is coupled to said extrusion screw; and a driving source coupled to said threaded shaft for driving said injection unit, wherein said balls are carburized and nitrided, and said threaded shaft and said nut are hardened but not by carburizing and nitriding.

2. The driving device as claimed in claim 1, wherein said balls have a surface hardness of not less than 62 in HRC.

3. The driving device as claimed in claim 1, wherein said threaded shaft is hardened by induction hardening or by carburizing hardening, and said nut is hardened by carburizing hardening.

4. The driving device as claimed in claim 1, wherein each of said balls has a surface hardness that is greater than 62 in HRC, and each of said threaded shaft and said nut have a surface hardness greater than zero and is less than or equal to 62 in HRC.

5. A driving device for an injection molding machine having an injection unit, a mold clamping unit having a movable platen, and an extrusion screw for extruding molten resin, said driving device comprising:

a ball screw including a threaded shaft, a nut and a plurality of balls disposed between said threaded shaft and said nut, wherein one of said threaded shaft and said nut is coupled to said movable platen of said mold clamping unit; and a driving source, coupled to the other of said threaded shaft and said nut, for driving said mold clamping unit, wherein said balls are carburized and nitrided, and said shaft and nut are hardened but not carburized and nitrided.

6. The driving device as claimed in claim 5, wherein said balls have a surface hardness of not less than 62 in HRC.

7. The driving device as claimed in claim 5, wherein said threaded shaft is hardened by induction hardening or by carburizing hardening, and said nut is hardened by carburizing hardening.

8. The driving device as claimed in claim 5, wherein each of said balls has a surface hardness that is greater than 62 in HRC, and each of said threaded shaft and said nut have a surface hardness greater than zero and is less than or equal to 62 in HRC.

* * * * *